United States Patent
Blais et al.

(10) Patent No.: US 7,657,081 B2
(45) Date of Patent: Feb. 2, 2010

(54) RECURSIVE 3D MODEL OPTIMIZATION

(75) Inventors: Francois Blais, Orleans (CA); Michel Picard, Chesterville (CA)

(73) Assignee: National Research Council of Canada, Ottawa, Ontario (CA)

( * ) Notice: Subject to any disclaimer, the term of this patent is extended or adjusted under 35 U.S.C. 154(b) by 909 days.

(21) Appl. No.: 10/933,265

(22) Filed: Sep. 3, 2004

(65) Prior Publication Data

US 2006/0050952 A1    Mar. 9, 2006

(51) Int. Cl.
*G06K 9/00* (2006.01)
(52) U.S. Cl. ........................ 382/154; 382/103
(58) Field of Classification Search ................ 382/154, 382/103, 199, 285, 294
See application file for complete search history.

(56) References Cited

U.S. PATENT DOCUMENTS

| 5,216,236 | A | * | 6/1993 | Blais ........................ 250/203.2 |
| 2003/0012424 | A1 | | 1/2003 | Franich et al. |
| 2003/0068079 | A1 | | 4/2003 | Park |
| 2003/0190091 | A1 | * | 10/2003 | Stewart et al. .............. 382/294 |
| 2004/0051783 | A1 | | 3/2004 | Chellappa et al. |
| 2005/0135670 | A1 | * | 6/2005 | Vaidyanathan .............. 382/154 |

FOREIGN PATENT DOCUMENTS

| EP | 1 308 902 | A2 | 5/2003 |
| GB | 2 389 500 | A | 12/2003 |

OTHER PUBLICATIONS

Stamos; 3-D Model Construction Using Range and Image Data; Columbia University, Department of Science; 2000; pp. 1-8; NY, USA.

Ramamoorthi; Creating Generative Models from Range Images; Stanford University, pp. 1-3; USA.

Rushmeier; 3D Capture for Computer Graphics; IBM T.J. Watson Research Center; pp. 1-7, Yorktown, NY, USA.

Havemann; A Versatile 3D Model Representation ofr Cultural Reconstruction; Institut fur ComputerGraphik, pp. 1-9; TU Braunschweig; DE.

3D Doctor:Create More Accurate 3D Models Using Vector-Based Technologies; pp. 1-4.

Yu; Recursive 3D Model Reconstruction Based on Kalman Filtering; pp. 1-30.

* cited by examiner

*Primary Examiner*—Duy M Dang
(74) *Attorney, Agent, or Firm*—Brion Raffoul

(57) ABSTRACT

Systems and methods for generating and optimizing 3D models of objects. A laser scanner is controlled by a data processing subsystem that controls the scanning and processes the data generated. From an initial model, either a raster scan of the object or an initial scan, the system scans the object multiple times, each time adjusting the laser scanner to maximize a correlation between the data generated and the model. The model is also updated using the scan data and taking into account the adjustments which were applied to the laser scanner. Other adjustments, such as those which would remove the effect of relative motion on the scan data, are also accounted for when incorporating scan data into the model. The model is recursively adjusted and optimized using previous scan data (both pre-recorded and fresh scan data) and previous adjustments. The model may be modified and adjusted using previous scan data and an Iterative Closest Point method. The method and systems may be used in uncontrolled environments where unpredictable motions and vibrations can occur. The invention may be used with scanners mounted on a robotic arm, scaffolding, unstable tripods, at the tips of booms or lifts, or the scanners may be simply held by hand.

27 Claims, 4 Drawing Sheets

RECURSIVE 3D MODEL OPTIMIZATION

FIELD OF THE INVENTION

The present invention relates to three dimensional modelling and, more specifically, it relates to systems and methods for generating and optimizing three dimensional models of objects.

BACKGROUND TO THE INVENTION

The recent growth in interest in digital photography and digital imaging has been fuelled by the dropping costs of digital cameras and flatbed scanners. However, one capability that still cannot be duplicated by these cheap consumer goods is the ability to create three dimensional (3D) models of objects.

As is currently known, 3D scanners can only measure one view of an object at a time. To completely reconstruct an object, multiple images must be acquired from different orientations. One option for combining these views is the use of complex and expensive optical or mechanical equipment to track the scanning as one complete scan. Another option would be to perform separate scans and use software to digitally combine the images together. Clearly, the first option is complex, physically cumbersome, and potentially very expensive. The second option, however, requires the development of routines and methods that are both useful and, ideally, fast. These routines and methods should be easily adaptable to existing hardware such as laser scanners and data processing systems.

Another major drawback of the existing systems is their requirement that the object being scanned be fixed and stable during the scanning process. Any undesired movement or vibration will introduce distortions and errors into the range data and thereby produce erroneous results.

SUMMARY OF THE INVENTION

The present invention provides systems and methods for generating and optimizing 3D models of objects. A laser scanner is controlled by a data processing subsystem that controls the scanning and processes the data generated. From an initial model, either a raster scan of the object or an initial scan, the system scans the object multiple times, each time adjusting the laser scanner to maximize a correlation between the data generated and the model. The model is also updated using the scan data and taking into account the adjustments which were applied to the laser scanner. Other adjustments, such as those which would remove the effect of relative motion on the scan data, are also accounted for when incorporating scan data into the model. The model is recursively adjusted and optimized using previous scan data (both pre-recorded and fresh scan data) and previous adjustments. The model may be modified and adjusted using previous scan data and an Iterative Closest Point method. The method and systems may be used in uncontrolled environments where unpredictable motions and vibrations can occur. The invention may be used with scanners mounted on a robotic arm, scaffolding, unstable tripods, at the tips of booms or lifts, or the scanners may be simply held by hand.

In a first aspect, the present invention provides a system for generating and improving a three dimensional model of an object, the system comprising:
 a scanner for scanning said object;
 a data processing subsystem communicating with and controlling said scanner, said subsystem comprising:
  a scanner controller for controlling said scanner
  an acquisition module for receiving scan data from said scanner and for determining a difference between said scan data and scan data from an immediately preceding scan session;
  an object tracking module for determining scanner adjustments to be made to said scanner prior to a next scan session for said object, said scanner adjustments being determined based on said model, said tracking module sending said scanner adjustments to see said scanner controller;
  a model update module for creating an initial model and for updating said model based on previous scans of said object, said update module receiving data on said previous scans from said acquisition module;
  a model adjustment module for determining scan adjustments to be made to previous scans of said object and for adjusting said model based on said scan adjustments, said adjustment module providing an adjusted model and said scan adjustments to said object tracking module and to said model update module.

In a second aspect, the present invention provides a method of improving a three dimensional model of an object, the method comprising:
 a) receiving scan data of said object;
 b) determining adjustments to be made to scan data to maximize a correlation between said scan data and said model;
 c) recursively determining an updated model of said object using previous scan data and previous adjustments; and
 d) repeating steps a)-c) until a desired model is achieved.

In a third aspect, the present invention provides a system for generating and improving a three dimensional model of an object, the system comprising:
 input means for receiving scanning data for said object;
 a data processing subsystem communicating with said input means, said subsystem comprising:
  an acquisition module for receiving scan data from said input means and for determining a difference between two sets of scan data;
  an object tracking module for determining adjustments to be made to said scan data prior to receiving a subsequent set of scan data from said input means, said adjustments being determined based on said model; and
  a model adjustment module for adjusting said model based on said adjustments, said adjustment module providing an adjusted model to said object tracking module.

BRIEF DESCRIPTION OF THE DRAWINGS

A better understanding of the invention will be obtained by considering the detailed description below, with reference to the following drawings in which.

DETAILED DESCRIPTION

Figure 1:
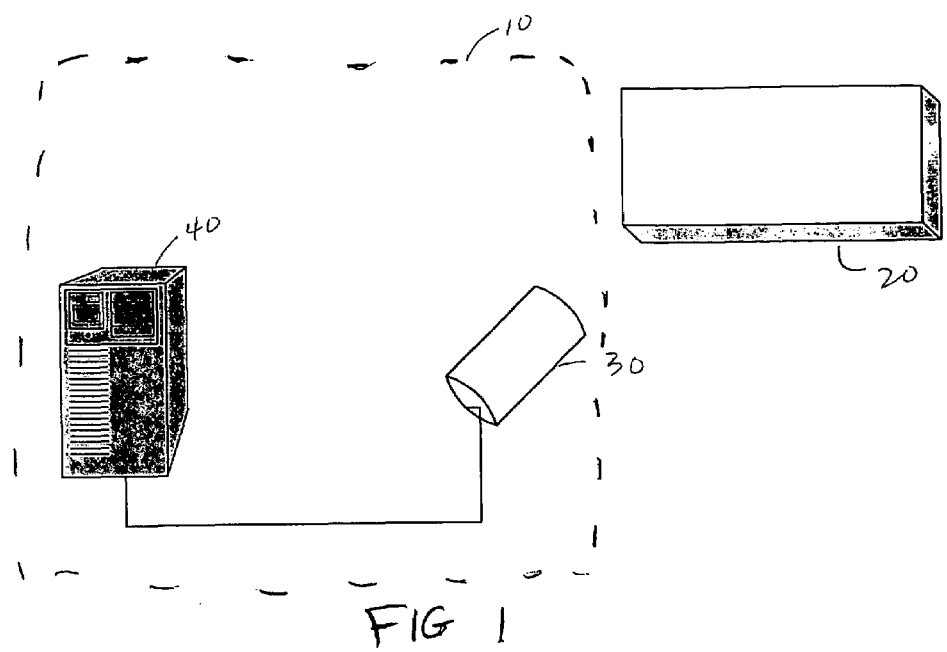
FIG. 1 illustrates a system for scanning 3D objects according to one aspect of the invention.

Referring to FIG. 1, a system 10 for generating and optimizing a 3D model of an object 20 is illustrated. The system 10 consists of a scanner 30 and a data processing subsystem 40. The data processing subsystem 40—controls the scanning of the object 20 by the scanner 30 and receives scan data from the scanner 30. The data processing subsystem 40 also processes the scan data from the scanner 30 to create a 3D model of the object 20.

One of the methods which may be used by the data processing subsystem 40 in processing the scan data is what is known as ICP (Iterative Closest Point) methods. Mathematically, the objective of these ICP methods is to find the rigid transformation matrix $M_k$ that will align the range data set $X_k$ in the scanner coordinate system with the model reference image data set $xm_k$ where $$xm_k = M_k x_k$$

$$x_k = [x\ y\ z1]^T$$

To use these methods, it is assumed that the images are rigid, accurate, and stable during the acquisition. As noted above, the prior art uses complex and expensive equipment to stabilize the scanner relative to the object being scanned. However, it should be noted that, as will be explained below, such rigidity and stability are not as necessary due to the present invention.

The solution explained in this document takes advantage of ICP methods to recursively improve a given model using scan data from successive scans of the object. Discrepancies between the model and the scan data due to motion by either the object or the scanner are compensated for, thereby obviating the previous need for rigidity and stability.

The computational method of the invention begins with scan data acquired by the scanner. The scan data $X_k$, a subset of $N_k$ calibrated range data, is composed of points $x_i$ with an associated time tag $t_i$:

$$x = [x\ y\ z1]^T$$

and $$X_K = \{x_i; t_i\}\ 0 \leq i \leq N_K$$

The subset corresponds to a profile or a full pattern or scan of the object. The time tag $t_i$ is used to compensate for motion induced distortions.

To best explain the process, we can assume that m is a point on the model and that $\hat{m}$ is an approximation of that point on the model. The problem of registration consists of finding the estimate $\hat{R}_K$ of the rigid transformation $R_k$ that minimizes the equation $$E_K = \sum_{i=0}^{N_{K-1}} \left\| \hat{m}_{k,i} - \hat{R}_K \hat{D}_i x_i \right\|^2$$

The estimated transformation $\hat{R}_K$ that minimizes the above equation also maximizes the correlation between the scan data $x_i$ and the estimated model $\hat{m}$. The variable $\hat{D}_i$ is an estimate of the compensation matrix $D_i$ that removes the residual distortions introduced within the scan data or profile $X_k$.

Assuming that a function $\Im$ creates a mesh model estimate $\hat{m}_K$ from a set of K previous scan data points $X_k$, the transformations $\hat{R}_K$ and compensation matrices $\hat{D}_i$ associated with those scan data points, this mesh model can be continuously updated by merely taking into account more and more scan data points. Mathematically, the model $\hat{m}_K$ can be expressed as $$\hat{m}_k = \Im(\hat{R}_k \hat{D}_i x_i) \forall k$$

For a small value of K, e.g. k=0, $\hat{m}$ is a very rough, sparse and potentially distorted estimate. As K increases, more scan data sets are added to the model. This fills in the gaps of the model, expands its surface, and refines its geometry. The model $\hat{m}_K$ is further optimized by iteratively reevaluating the transformation matrices $\hat{R}_K$ and a new model $\hat{m}$ estimate can be recreated that minimizes the total error $$E = \sum_{k=0}^{K-1} \varepsilon_k$$

To simplify the implementation the initial model estimate can be only a local representation of a small portion of the complete object. Further scans will not only improve on this initial scan (optimization will converge to a more accurate representation of the portion) but will also expand on a good model and will extend the model to encompass the complete object.

It should be noted that further improvements on the model may be obtained by interpolation the estimates $\hat{D}_i$ of the motion distortion matrix $D_i$ for each measurement i using a function $\Omega$ and a time tag $t_i$. Motion is interpolated from the relative trajectory of the object or scanner given by the matrices $\hat{R}_K$ such that $$\hat{D}_i = \Omega \rangle \ldots, \hat{R}_{K-1}, \hat{R}_k, \hat{R}_{k+1}, \ldots, t_1 \rangle$$

The simplest form of $\Omega$ is a linear interpolation between the $\hat{R}_{k-1}$, $\hat{R}_k$ using, as an example, quaternion for the rotation. Better results may be obtained by using smoothed interpolations using $\hat{R}_{k-1}, \hat{R}_k, \hat{R}_{K+1}$, bi-cubic interpolations, or including acceleration.

If k is sufficiently large, the final model should, ideally, be a very close representation of the exact model. That is, $\hat{m}_k = m$, $\hat{R}_k = R_k$, and $\hat{D}_i = D_i$ It should be noted that, as explained above, the transformation/registration matrices $\hat{R}_K$ represent the scan adjustments that scan data must undergo to maximize correlation with the model. As such, these scan adjustments may take the form of translations and/or rotations to be applied to the scan data. The motion compensation matrices $\hat{D}_i$ are derived by taking into account the different registration matrices $\hat{R}_K$. As an example, if the registration matrices show that there is consistent movement in one direction and that the amount of this movement is constant, the compensation matrices can be adjusted to negate this motion's effects. Changes in motion can be calculated from the matrices $R_{k-1}$, $R_k$, $R_{k+1}$ and this change in motion can be compensated for in the model.

It should further be noted that the initial model, while a very rough estimate as outlined above, can initially consist of a small portion of the object. As subsequent scans are performed, a progressively larger portion of the object is included in the model while the resolution of the original portion is also progressively increased. As k increases, the model not only gets larger but is improved on as well.

The tasks outlined above can be divided into three general categories—tracking, model creation, and model refinement.

The tracking task consists of tracking the relative position of the object from the scanner. From the matrices $R_k$, the relative position of the object from the scanner is known. Also from $R_k$, scanner adjustments to the scanner position can be determined to obtain better or merely different scans of the object. Thus, $R_k$ can be used to derive scanner adjustments to adjust the positioning of the scanning pattern on the object. The scanning pattern to be used will be discussed further in this document.

The model creation task adds new profiles or scan data $X_k$ to the model estimate $\hat{m}$ to expand the model. This model estimate is improved upon by the model refinement task. The refinement task recursively optimizes the model $\hat{m}$ using the previous profiles or scan data $\forall X_k$ or any scan data that fits a certain, predetermined criteria such as rigel (Range Image Element) resolution. Also during this task, the removal of any motion induced distortion can be accomplished by taking into account the matrices $D_i$ into the model.

To improve the performance of the system in terms of tracking, it has been found that, while the ICP method will eventually provide acceptable tracking of the object, a faster shortcut would be to use the approximate geometry of the object and fast correlation methods. The center of mass of the local geometry can be used as the centerpoint for the scanning. Possible drifts in the tracking induced by these local but fast linear approximation methods can be asynchronously compensated for by $R_k$. $R_k$ can be used to predict the location of the object and thereby to supervise the object's tracking. As a means of providing not only good tracking but also a good initial scan, a raster scan of the object may be used as the initial model. However, such a raster scan would only be useful if the object motion is slow and is relatively stable.

Figure 2:
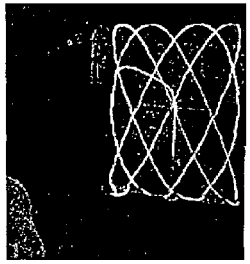
FIG. 2 illustrates a Lissajous scanning pattern overlaid an object being scanned.

With respect to the scanning patterns that may be used by the scanner to scan the object, a Lissajous scanning pattern has been found to provide acceptable results. The image in FIG. 2 illustrates the Lissajous scanning pattern as a laser scanner scans the object. Multiple Lissajous, fast Lissajous, and combined Lissajous and raster/vector scanning patterns may be used. Pattern projection methods such as those that utilize grids of lines or points may also be used provided that a time stamp $t_i$ is given or calculated.

Figure 3:
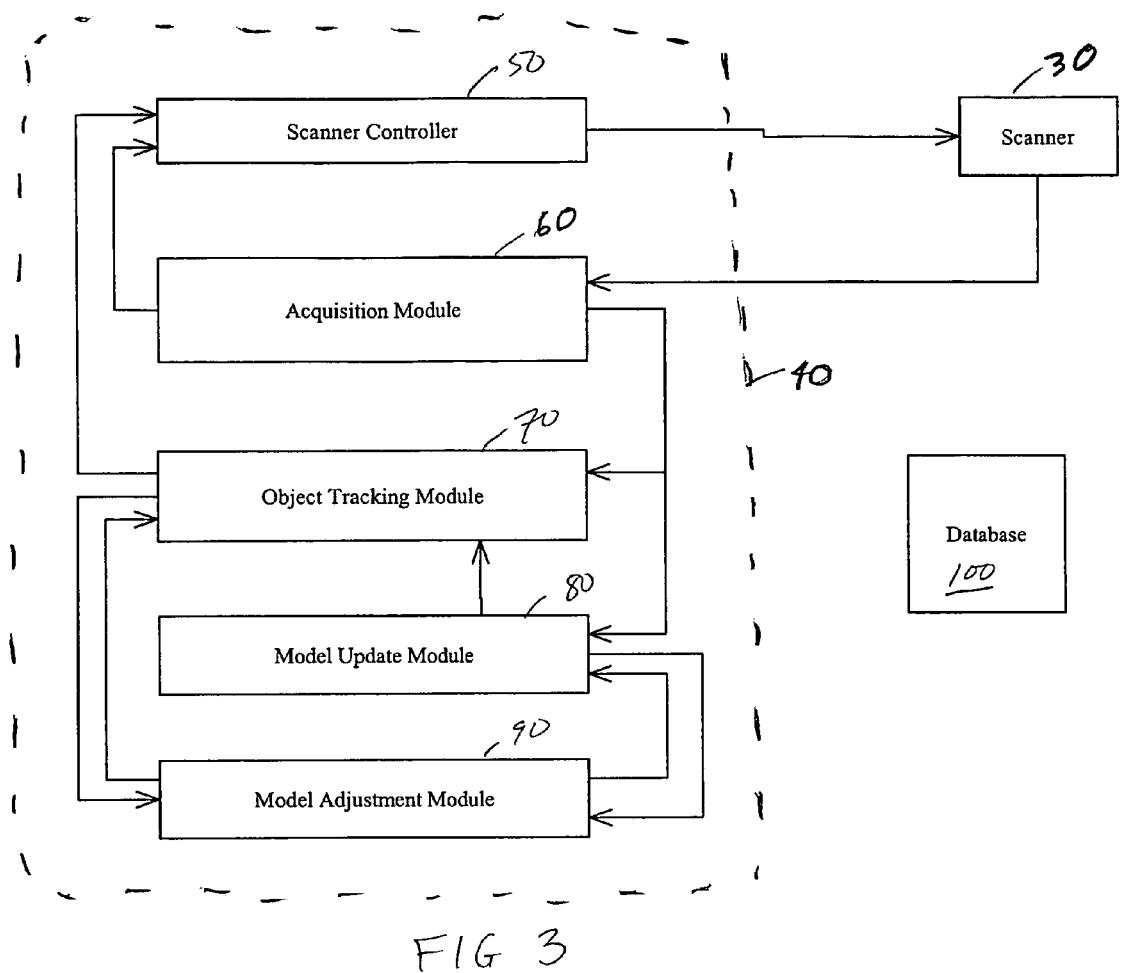
FIG. 3 is a block diagram of a data processing subsystem which may be used with the system illustrated in FIG. 1.

To implement the above method, a multiple module system as illustrated in FIG. 3 may be used.

The system in FIG. 3 has a scanner 30 and the data processing subsystem 40 has a scanner controller 50, an acquisition module 60, an object tracking module 70, a model update module 80, and a model adjustment module 90. The scanner controller 50 sends scanner commands to the scanner while receiving tracking errors from the acquisition module 60 and scan position/adjustments from the object tracking module 70. The scanner controller 50 controls the scanner 30 and how the scanner 30 scans the object 20. Based on input from the modules, the scanner controller 50 can adjust the scanning pattern used by the scanner 30, the scanner's scanning position, and the speed of the scanning.

The acquisition module 60 receives scan data from the scanner 30 while transmitting a tracking error to the scanner controller 50. The acquisition module also sends the scan data to the model update module 80. The acquisition module 60 determines tracking error by determining a correlation between the most recent scan data and either the immediately preceding scan data or the reference geometry of the object. This way, the scanner controller 50 has a near real-time feedback mechanism to adjust the scanning. Each scanning session produces one profile or one set of scan data. The most recent scan data can thus be correlated with the scan data from the immediately preceding scan session. Based on the amount of correlation between these sets of scan data, the acquisition module can determine how much or how little to adjust the scanning. The acquisition module 60 also forwards the scan data to the model update module 80 and the object tracking module 70.

The object tracking module 70 determines $R_k$ from the equations given above based on the scan data received from the acquisition module 60. Once $R_k$ is found for a specific scanning session, the object tracking module can determine whether a larger portion of the object needs to be scanned or whether the scanning position needs to be adjusted. These scan adjustments, based on $R_k$ and the model $\hat{m}$, adjust where to scan and how much to scan of the object. With $R_k$ calculated, this matrix can be transmitted to the model adjustment module 90 while the scanning position adjustments can be sent to the scanner controller 50. As an example of scan adjustments, the initial scan may only cover a portion of the object. Subsequent scans, as dictated by the scan adjustments, may cover progressively larger and larger sections of the object. It should be noted that the object tracking module requires the model $\hat{m}$ to calculate the transformation $R_k$. As such, the module 70 receives the model from the model update module 80 or the model adjustment module 90. The module 70 determines which is the latest model and uses that in its calculations.

The model update module 80 creates a reference model if one has not yet been defined or, if a model already exists, updates the current model using all previous scan data. If a model has not yet been defined, the model update module 80 waits until the tracking error is small (from the acquisition module 60) and uses all the previous scan data/profiles and the previously computed $\hat{R}_K$ to create a first approximation of $\hat{m}$. This approximation of $\hat{m}$ can therefore be used by the other modules and can be further adjusted as subsequent scans expand and improve the model. If a reference model has been defined, then the model update module 80 expands on the model by using all the previous scan data (including the most recent scan data from the most recent scan session) to update the model. This updated model is then sent to the object tracking module 70 and the model adjustment module 90. It should be noted that the model can start with only one profile with this profile being the reference model.

The model adjustment module 90 adjusts the model and computes better estimates of both the registration matrix $R_k$ and the motion compensation matrix $D_k$. The model adjustment module 90 receives the updated model from the model update module 80 along with the registration matrix $R_k$ from the object tracking module 70. The model adjustment module 90 recursively recomputes better results of $R_k$ from all the previous scan data and the previous results of $R_k$. Also, the model adjustment module 90 takes into account the motion compensation matrix $\hat{D}_k$ in computing better values for not only the registration matrix $R_k$ but also, more importantly, the model. Once better results are computed for the matrix $R_k$ and for an adjusted model $\hat{m}$, these values as distributed to the object tracking module 70 and the model update module 80.

One option that cuts down on the number of data transfers between the modules is the use of a centralized database 100. The database 100 would contain all previous data scans, their associated registration matrices $R_k$, their associated motion compensation matrices $D_k$, and the updated or adjusted model. Use of a database 100 would allow the different modules to only send and receive their data to one location. As an example, the model adjustment module 90 would only need to transmit its adjusted model to the database and would not need to transmit the adjusted model directly to the other modules. The data in the database can be stored in large arrays of data structures.

With respect to the ICP method which may be used (the choice of ICP method influences the selection of point $\hat{m}$ to be used in the error calculation which determines $\hat{R}_K$, it has been found that any ICP method would work. As an example, reference should be made to S. Rusinkiewic and M Levoy, "Efficient variant of the ICP algorithm", Proc. 3DIM 2001, 145-152, 2001, which is herein incorporated by reference. However, it has been found that point to surface methods provided faster results than point to point methods.

Regarding the actual implementation of the system, one implementation would utilize parallel processing to increase system throughput. Each module can be implemented as a separate processing unit with its own dedicated processor. Such an implementation would allow each module to operate independently of the others. The QNX(TM) operating system can be used for the modules which operate on the real-time tracking and the Windows (TM) operating environment may be used for the non-real time aspects of the system such as object reconstruction and ICP method implementation. The asynchronous, multitasking nature of the system can be implemented using the TCP/IP protocol between the two operating systems.

Figure 4:
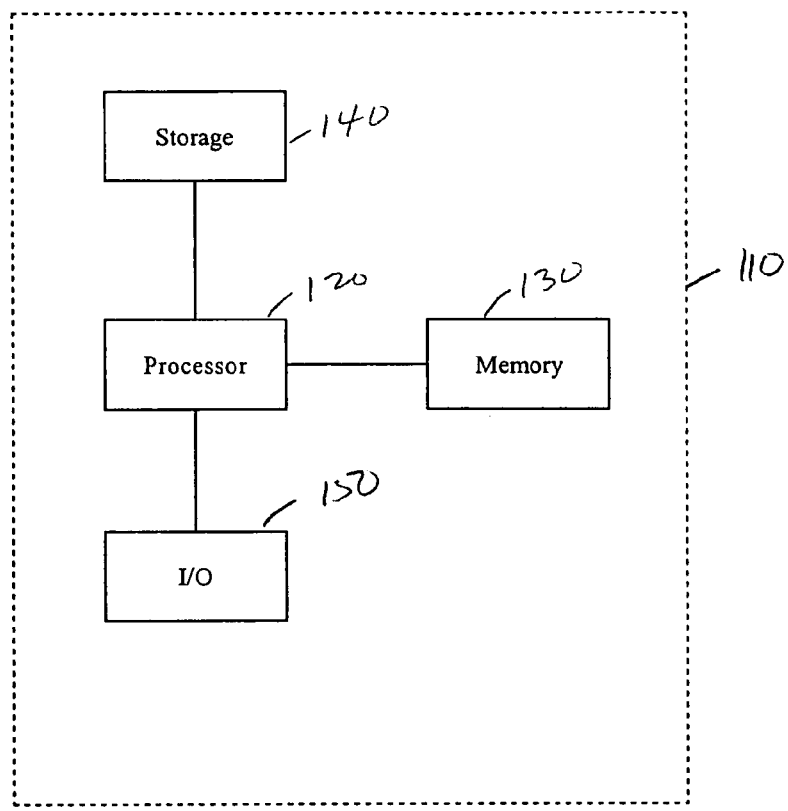
FIG. 4 is a block diagram of a processing unit which may be used as a module in the subsystem of FIG. 3.

Referring to FIG. 4, each of the above modules can take the form of the subsystem 110. The subsystem has a processor 120, a memory 130, local storage 140, and an input/output subsystem 150. The subsystem 110 can communicate with the other modules or the database 100 through the I/O subsystem 150.

A laser scanner can be used as the scanner in FIGS. 1 and 3. A flying spot laser scanner based on triangulation was used in one implementation. Using two single profile scanners may also work but it has been found that a 2D projection system which provides a time stamp associated with each point provides acceptable results. Time of flight systems can, with minimal changes, also provide acceptable results.

Figure 5:
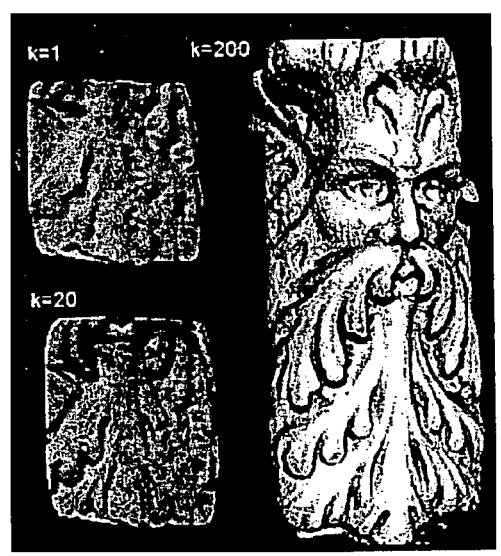
FIG. 5 is a view of achievable results in various stages of optimization and with various numbers of scans.

As an example of achievable results, FIG. 5 shows the progressive models achieved in the implementation explained above. The upper left figure is the initial model of the object and covers only a small potion of the object. This initial model is clearly rough and distorted. With more scans (k=20), the model is shown in the lower left corner. A larger section of the object is covered and greater resolution can be seen. The model after 200 scans (k=200) is shown in the right hand image. The object is now fully visible and the region covered by the initial model (the region just below the mouth) is greatly enhanced.

Figure 6A:
FIG. 6A is a raster scan image of an object to be used as an initial model.
Figure 6B:
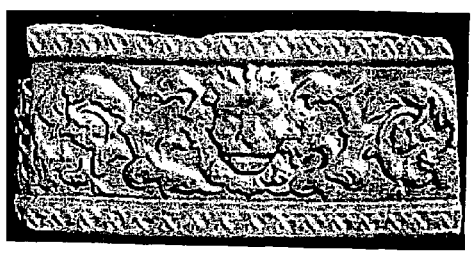
FIG. 6B is an optimized image of the object in FIG. 6A after optimization and multiple scans.

Another example of what is achievable with the above-noted system and method is illustrated in FIGS. 6A and 6B. The object being scanned is the same object that has the Lissajous pattern overlaid on it in FIG. 2. FIG. 6A illustrates the initial model of the object. As can be seen, the initial model is blurred and distorted. The final model is illustrated in FIG. 6B. This final model was obtained using optimization and was scanned with multiple Lissajous patterns. With k=4000, the resolution of the final model is a significant improvement on the initial model.

The examples in FIGS. 5 and 6A illustrate two methods of obtaining an initial model. The initial model in the upper left corner of FIG. 5 comprises a small portion of the object. This model was improved on and its coverage of the object was increased by subsequent scans. On the other hand, the initial model illustrated in FIG. 6A was obtained as a 128×128 raster image.

In generating the examples, it was found that a factor that affects the quality of the results is calibration of the range data and compensation for its dynamic properties. Most scanners produce range (scan) data in the form of $x=[x\ y\ z\ 1]^T$, which is an approximation of the true form of $x=[x(t)\ y(t)\ z(t)\ 1]^T$. Such an approximation is workable as the scanner is used in a static mode (the scanner is kept relatively stable).

It should be clear from the above that the scanner used in the system may be handheld or relatively stable on a platform. However, this stability does not mean that the scanner requires elaborate scaffolding or stability structures as explained in the Background section. Rather, the scanner does not need to be perfectly still or stable as the method outlined above can compensate for the slight motion of such a mounting.

Figure 7:
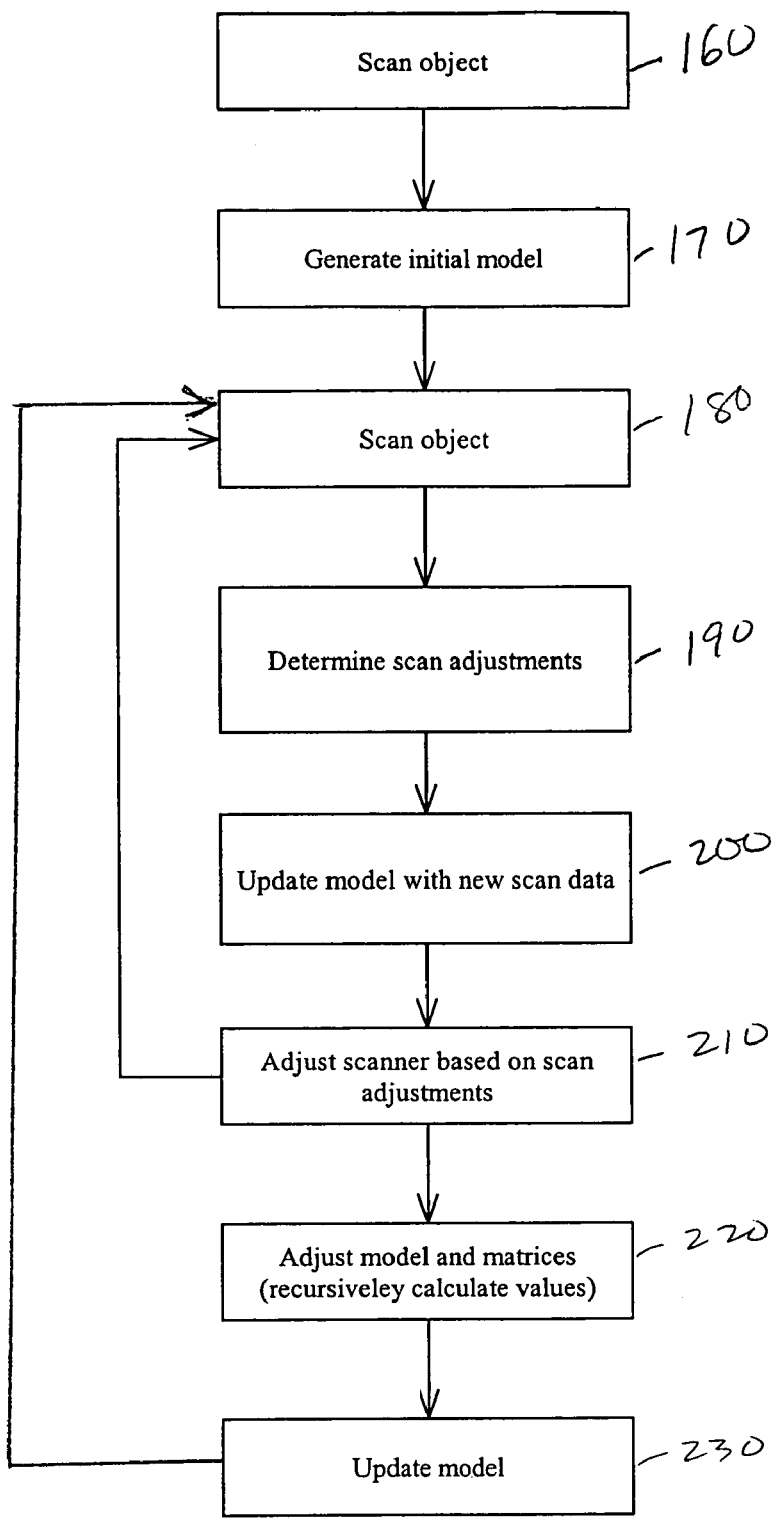
FIG. 7 is a flowchart of the method used to obtain the images of FIGS. 5 and 6B according to another aspect of the invention.

The method outlined above can be illustrated as shown in FIG. 7. The method begins with an initial scan of the object (step 160). This initial scan may be a simple raster scan of the whole object (as illustrated in FIG. 6A) or a scan of a small portion of the object (as illustrated in FIG. 5). The next step is that of generating the initial model (step 170). With the initial model generated, it can now be improved upon using subsequent scans of the object.

Step 180 is that of, again, scanning the object. Once the object is scanned, the scan adjustments are determined (step 190). This step includes calculating the registration matrix $R_k$, determining the tracking error, and finding the adjustments to be made to the scanning position. Step 200 then updates the model with the new scan data obtained in step 180. This step can enlarge the model if the initial model only covers a portion of the object or, if the initial model was a raster scan of the whole object, it can increase the resolution of the model.

Once the calculations for the different matrices are done and the model has been updated, the scanner can be adjusted based on the scan adjustments found in step 190 (step 210). Once the scanner has been adjusted, control loops back to the beginning of the loop at step 180. Steps 180-210 comprise a control loop that continuously scans the object and improves the model.

While the control loop is being executed, step 220 can also be executed concurrently. Step 220 recursively adjusts the model and generates better results for the registration matrix. This step also calculates the motion compensation matrix $D_j$ and adjusts the model based on the better results for $R_k$ and $D_j$. Once the adjusted model has been calculated, the model used by the method is updated in step 230. This updated model can be feedback in the control loop at any time to further refine the model.

As noted above, the method can be performed with some steps being performed concurrently (in parallel) with others. The method may also be performed sequentially, with steps 220 and 230 being performed after step 210 with the control loop not returning to step 180 until after step 230 is executed.

It should be noted that the above describes one embodiment of the invention. Other embodiments are also possible. As an example, while the system in FIG. 1 includes a scanner 30, another embodiment would include an input means that merely receives scan data from a source for transmission to the data subsystem. The input means can be the scanner itself. The scan data may be pre-recorded scan data that is received by the system 10 from which the system constructs a 3D model. The pre-recorded scan data may be stored in the database 100. Such a system, if using pre-recorded scan data, may dispense with a scanner controller. Pre-recorded scan data may also be used in conjunction with the scanner/controller configuration if desired.

Similarly, the system may, with or without the scanner and its controller, dispense with the model update module 80. Such a system would generate its own rough estimate of a model and continuously adjust the model based on either fresh scan data or pre-recorded scan data. The adjustment of the model may also take into consideration any or all of the following: the object's position, speed, and acceleration.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for generating and improving a three dimensional model of an object, the system comprising:
    a scanner for scanning said object;
    a data processing subsystem communicating with and controlling said scanner, said subsystem comprising:
        a scanner controller for controlling said scanner;
        an acquisition module for receiving scan data from said scanner and for determining a difference between said scan data and scan data from an immediately preceding scan session;
        an object tracking module for iteratively determining scanner adjustments to be made to said scanner prior to a next scan session for said object, said scanner adjustments being determined based on said model, said tracking module sending said scanner adjustments to said scanner controller;
        a model update module for creating an initial model which is a representation of a portion of said object and for iteratively updating said model based on previous scans of said object and said difference between said scan data and scan data from an immediately preceding scan session, said update module receiving data on said previous scans from said acquisition module;
        a model adjustment module for iteratively determining scan adjustments which, when said scan adjustments are applied to previous scan data of said object maximizes a correlation between said previous scan data and said model and thereby compensates for distortions due to relative motion between said object and said scanner and for iteratively adjusting said model based on all of said scan adjustments, said adjustment module providing an adjusted model and said scan adjustments to said object tracking module and to said model update module, said scan adjustments comprising translations and rotations to be applied to scan data.

2. A system according to claim 1 wherein said scanner scans said object in a predetermined pattern.

3. A system according to claim 1 wherein said predetermined pattern is a Lissajous pattern.

4. A system according to claim 1 wherein said scanner adjustments are based on an amount of translation and/or rotation by which a preceding scan must be adjusted to maximize a correlation between said preceding scan and said model.

5. A system according to claim 1 wherein each of said modules comprises a processor for processing relevant data.

6. A system according to claim 1 wherein said scan adjustments comprise a registration matrix for maximizing a correlation between said model and said scan when said registration matrix is applied to data from a scan.

7. A system according to claim 1 wherein said scan adjustments further comprises a distortion matrix for maximizing a correlation between said model and said scan when said distortion matrix is applied to said data from a scan by removing distortions introduced in said scan by motion.

8. A system according to claim 1 wherein an initial model used by said system is a raster image of said object.

9. A method of improving a three dimensional model of an object, the method comprising:
    a) receiving scan data of said object;
    b) determining scan adjustments to be made to scan data to maximize a correlation between said scan data and said model, said scan adjustments being for compensating for distortions due to relative motion between said object and a scanner providing said scan data, said scan adjustments comprising translations and rotations to be applied to said scan data;
    c) recursively determining an updated model of said object using previous scan data and previous adjustments; and
    d) repeating steps a)-c) until a desired model is achieved.

10. A method according to claim 9 wherein step c) is accomplished using an Iterative Closest Point method.

11. A method according to claim 9 wherein an initial model of said object is a raster scan of said object.

12. A method according to claim 9 wherein said scan adjustments comprises a registration matrix for maximizing a correlation between said scan data and said model when said registration matrix is applied to said model.

13. A method according to claim 12 wherein said scan adjustments further comprises a distortion matrix for maximizing a correlation between said model and said scan data when said distortion matrix is applied to said scan data by removing distortions introduced in said scan by motion.

14. A method according to claim 9 further including the step of scanning said object to generate said scan data.

15. A method according to claim 14 wherein said object is scanned in a predetermined pattern.

16. A method according to claim 15 wherein said predetermined pattern is a Lissajous pattern.

17. A method according to claim 9 wherein said scan data is pre-recorded scan data.

18. A method according to claim 9 further including the step of updating said model using a position and a speed of said scanning.

19. A method according to claim 9 further including the step of updating said model using a position, a speed, and an acceleration of said scanning.

20. A method according to claim 9 wherein said adjustments are based on an amount of translation and/or rotation by which a preceding scan data set must be adjusted to maximize a correlation between said preceding scan data set and said model.

21. A system for generating and improving a three dimensional model of an object, the system comprising:
  input means for receiving scanning data for said object;
  a data processing subsystem communicating with said input means, said subsystem comprising computer readable storage medium having encoded thereon:
    an acquisition module for receiving scan data from said input means and for determining a difference between two sets of scan data;
    a model adjustment module for iteratively determining scan adjustments which, when said scan adjustments are applied to scan data of said object, maximizes a correlation between said scan data and said model and thereby compensates for distortions due to relative motion between said object and means for scanning the object and for iteratively adjusting said model based on all of said scan adjustments, said scan adjustments comprising translations and rotations to be applied to scan data.

22. A system according to claim 21 wherein said input means is a scanner controlled by said data processing subsystem.

23. A system according to claim 21 wherein said input means receives pro-recorded scan data for transmission to said data processing subsystem.

24. A system according to claim 23 wherein said input means receives new scan data in addition to said pro-recorded scan data.

25. A system according to claim 21 wherein said adjustments are based on an amount of translation and/or rotation by which a preceding scan data set must be adjusted to maximize a correlation between said preceding scan data set and said model.

26. A system according to claim 21 wherein said adjustments comprise a registration matrix for maximizing a correlation between said model and said scan data when said registration matrix is applied to said scan data.

27. A system according to claim 21 wherein said adjustments comprise a distortion matrix for maximizing a correlation between said model and said scan data when said distortion matrix is applied to said scan data by removing distortions introduced in said scan data by motion.

* * * * *